United States Patent [19]

Beccaris

[11] 4,398,625
[45] Aug. 16, 1983

[54] TORSION DAMPING DEVICE FOR A MOTOR VEHICLE CLUTCH

[75] Inventor: Carlo Beccaris, Santena, Italy

[73] Assignee: VALEO Societe Anonyme, Paris, France

[21] Appl. No.: 162,637

[22] Filed: Jun. 24, 1980

[30] Foreign Application Priority Data

Jun. 25, 1979 [FR] France .................. 79 16230

[51] Int. Cl.³ .................................... F16D 3/14
[52] U.S. Cl. ............................ 192/106.2; 464/68
[58] Field of Search ............ 192/106.2; 64/27 C, 64/27 F; 464/68

[56] References Cited

U.S. PATENT DOCUMENTS

| | | | |
|---|---|---|---|
| 1,861,251 | 5/1932 | Wemp | 192/106.2 |
| 2,210,074 | 8/1940 | Friedman | 192/106.2 |
| 2,920,733 | 1/1960 | Lysett | 192/106.2 |
| 4,044,873 | 8/1977 | Parsons et al. | 192/106.2 |
| 4,056,179 | 11/1977 | Huber | 192/106.2 |
| 4,212,380 | 7/1980 | Billet | 192/106.2 |
| 4,239,097 | 12/1980 | Greacen et al. | 192/106.2 |

FOREIGN PATENT DOCUMENTS

| | | | |
|---|---|---|---|
| 2446976 | 4/1976 | Fed. Rep. of Germany | 192/106.2 |
| 2549103 | 5/1977 | Fed. Rep. of Germany | |
| 2844536 | 4/1979 | Fed. Rep. of Germany | 192/106.2 |
| 2171835 | 9/1973 | France | |
| 2370902 | 9/1978 | France | |
| 2398927 | 3/1979 | France | 192/106.2 |
| 2406123 | 11/1979 | France | |
| 438388 | 8/1948 | Italy | 464/68 |
| 1394865 | 5/1975 | United Kingdom | 192/106.2 |
| 1527915 | 10/1978 | United Kingdom | 192/106.2 |
| 2006921 | 5/1979 | United Kingdom | |
| 2054098 | 2/1981 | United Kingdom | 192/106.2 |
| 2060819 | 5/1981 | United Kingdom | 464/68 |

Primary Examiner—Rodney H. Bonck
Attorney, Agent, or Firm—Charles E. Brown

[57] ABSTRACT

The invention relates to a torsional-vibration damping hub for a clutch friction plate. The hub comprises two coaxial parts mounted for limited relative angular displacement against the action of circumferential springs disposed between the parts. Axially-acting spring means are also provided for acting on friction means disposed between the parts, and these spring means comprise a clamping disc provided with elastically deformable, radially projecting lugs. These lugs extend from the internal periphery of the clamping disc and are each bent to form a dihedral angle.

This arrangement enables an improved distribution of the axial clamping force over known arrangements.

10 Claims, 10 Drawing Figures

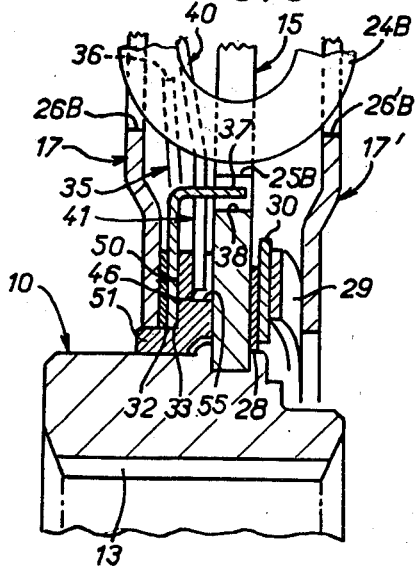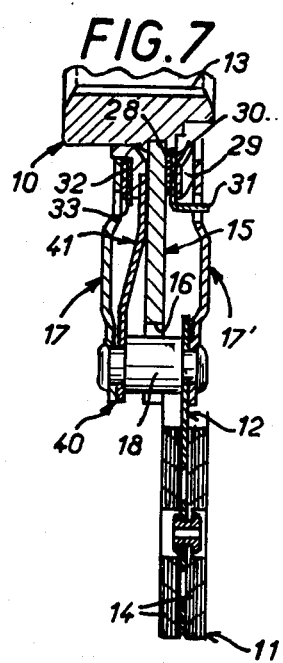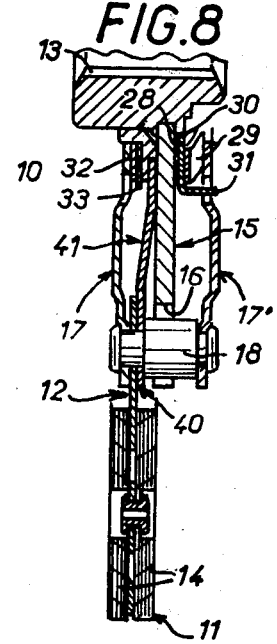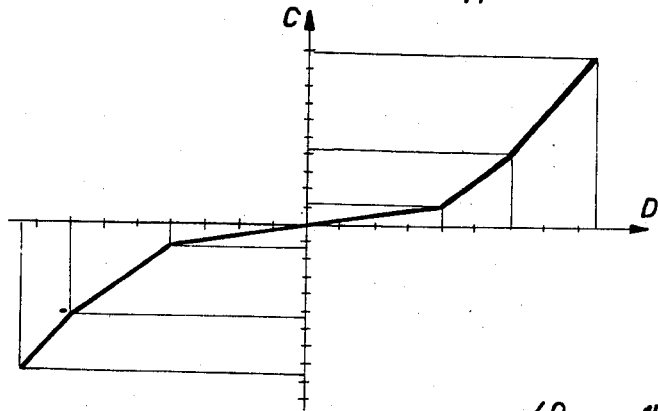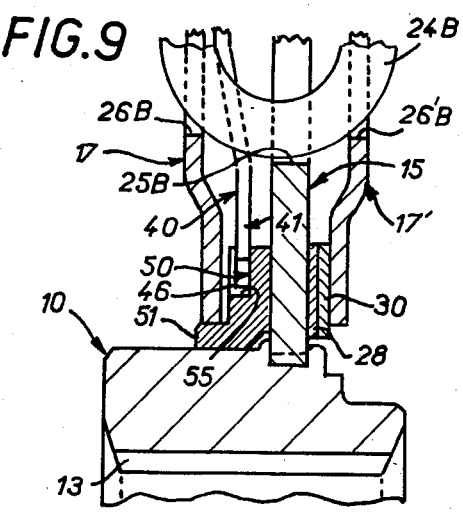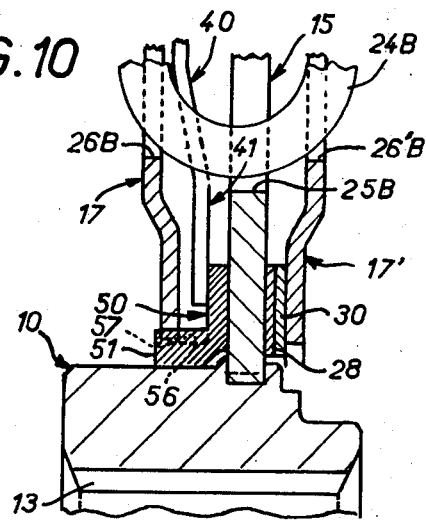

TORSION DAMPING DEVICE FOR A MOTOR VEHICLE CLUTCH

BACKGROUND OF THE INVENTION

The present invention relates generally to torsion damping devices of the kind comprising two coaxial parts mounted for limited angular movement relative to one another within a predetermined sector, and elastic means interposed circumferentially between the two parts.

Torsion damping devices of this kind make it possible to achieve the regulated transmission of torque from one coaxial part to the other, and filter out the vibrations, and in particular the sound vibrations, which can occur throughout the length of the kinematic chain in which the torsion damping device is fitted.

Such devices are often fitted in clutches, and in particular in motor vehicle clutches, in the form of assemblies commonly referred to as clutch plate assemblies with a damping hub, in which case one of their parts carries a friction disc capable of being clamped between two elements integral in rotation with a first shaft, which in practice in a driving shaft, whilst the other part is rotationally fixed to a second shaft, which in practice is a driven shaft.

It is known to insert, between the two coaxial parts of such a torsion damping device, friction means which introduce a hysteresis effect into the operational characteristics of the device; as is known, this hysteresis effect results in a difference, for the same angle of movement between the parts, between the value of the torque transmitted between these parts during a first direction of movement, which is commonly referred to as the positive direction and corresponds to the drive condition of the whole arrangement, and the value of this torque transmitted during the opposite direction of movement, which is commonly referred to as the overrun direction and corresponds to the overrun condition of the arrangement.

In fact, it is shown that, for certain applications, this hysteresis effect makes a contribution towards limiting the vibrations and the noise emitted by all the rotating members in the kinematic chain to which the driving and driven shafts in question belong.

In practice, the friction means employed for this purpose generally comprise at least one friction washer, which is axially interposed between the two rotatable parts, the said friction washer being in contact with one of these parts whilst being capable of being rendered integral in rotation with the other part for at least a portion of the sector of angular movement between these parts, and which is subjected to an axial elastic clamping force.

An arrangement of this kind is described in French Patent Application No. 76/34242 filed on Nov. 15, 1976 and published under No. 2,370,902.

This French patent application proposes, amongst various possible embodiments, to produce the axial elastic clamping force by means of a clamping disc provided with elastically deformable, radially projecting lugs.

However, in this patent application, which moreover relates to a very particular arrangement, the radial lugs on this clamping disc extend from the external periphery of the disc, in order to bear axially on the short posts joining together the guide discs which customarily constitute one of the rotatable coaxial parts in question.

As a result, in this embodiment, it is the clamping disc itself which acts axially on the friction washer associated therewith.

Although this arrangement has proved and continues to prove satisfactory, it exhibits various disadvantages.

First of all, if no play is allowed for its lugs in a direction at right angles to the posts, the clamping disc is to some extent restricted by the lugs and its axial elasticity is thereby limited. Now, in practice, this play is not easily compatible with the axial clamping which the posts in question must provide. Moreover, the number of radial lugs which this clamping disc can incorporate is dependent on the number of posts, and this can prove inadequate for obtaining the desired clamping force.

The object of the present invention is to provide a torsion damping device having an elastic clamping disc which does not exhibit these disadvantages.

SUMMARY

The invention provides a torsion damping device for a motor vehicle clutch, of the kind comprising two coaxial parts which are mounted for limited relative angular movement within a predetermined sector, elastic means interposed circumferentially between the two said parts, at least one friction washer interposed axially between the two said parts, and axially-acting elastic clamping means acting on said friction washer which is in contact with one of the said parts and is capable of being rendered integral in rotation with the other of said parts, for at least a portion of the said angular movement, the said elastic clamping means comprising a clamping disc provided with elastically deformable, radially projecting lugs which extend from the internal periphery thereof, each of these lugs being designed with a median bend which delimits two sections forming a dihedral angle with one another, namely a base section, by means of which the lug is connected to the clamping disc, and which deviates from the plane of the latter, and an end section, by means of which the lugs is adapted to act axially.

Thus, it is the radial lugs on the clamping disc rather than the clamping disc itself, which freely ensure the desired elastic axial clamping, without being restricted and hence with maximum effectiveness.

Moreover, the bending of the radial lugs on the clamping disc according to the invention exhibits various advantages. First of all, it provides these radial lugs with better flexibility.

Furthermore, it enables their end sections to be approximately perpendicular to the axis of the whole arrangement during operation, and this ensures a better distribution, over the elements involved, of the axial clamping force which the end sections exert during operation.

Finally, with the torsion damping device constituting a clutch plate assembly with a damping hub comprising a friction disc and a disc forming an integral part of the web of the friction disc of the lugs on the clamping disc, the particular bending, according to the invention, makes it possible to avoid a cone reaction capable of jeopardising the uniform wear of the friction linings of the friction disc.

In such a case, with the web of the friction disc customarily having its external peripheral part out into blades, each of which is connected to the remainder of this web by means of an approximately radial foot, each radial lug on the elastic clamping disc is preferably set up at right angles to this foot, that is to say approximately along one and the same radius thereof.

As a result, with this foot corresponding to a relatively stiffer part of this web, the reaction on the friction linings of the elastic axial clamping force is minimized.

However, it is self-evident that a clamping disc of this type does not necessarily constitute part of the web of the friction disc. In contrast, as a variant, it can form a part which is separate from the said web.

In all cases, over at least part of their length, the lateral edges of a radial lug on the elastic clamping disc according to the invention are preferably oblique relative to the radius passing through the median zone of the lug, and converge towards one another in the direction of the axis of the assembly.

By virtue of the overall triangular shape which each radial lug thus possesses, the flexural stress to which the radial lug is subjected is advantageously constant throughout the radius passing through its median zone.

However, the free end of the end section of this lug is preferably widened and not pointed.

The practical construction of a radial lug of this type is thereby facilitated since this radial lug does not possess a weak point of this location, in particular during the heat treatment which is customarily applied thereto.

Moreover, this radial lug thus offers, at this location, which constitutes its active part, a better seating for the elements for which it must ensure axial clamping, and this results in a better distribution, over the said elements, of the axial elastic clamping force which the lug develops on the latter.

BRIEF DESCRIPTION OF THE DRAWINGS

FIG. 3 repeats, on a larger scale, the detail in FIG. 2 identified by an inset III in FIG. 2;

FIG. 6 is a graph illustrating the mode of operation of a torsion damping device according to the invention;

FIG. 7 is a partial view in axial section of a modified embodiment of a torsion damping device;

FIG. 8 is a similar view to that in FIG. 7, but showing another modified embodiment; and FIGS. 9 and 10 are partial views similar to that of FIG. 3 showing variations of another torsion damping device according to the invention.

DETAILED DESCRIPTION OF THE PREFERRED EMBODIMENTS

Figure 1:
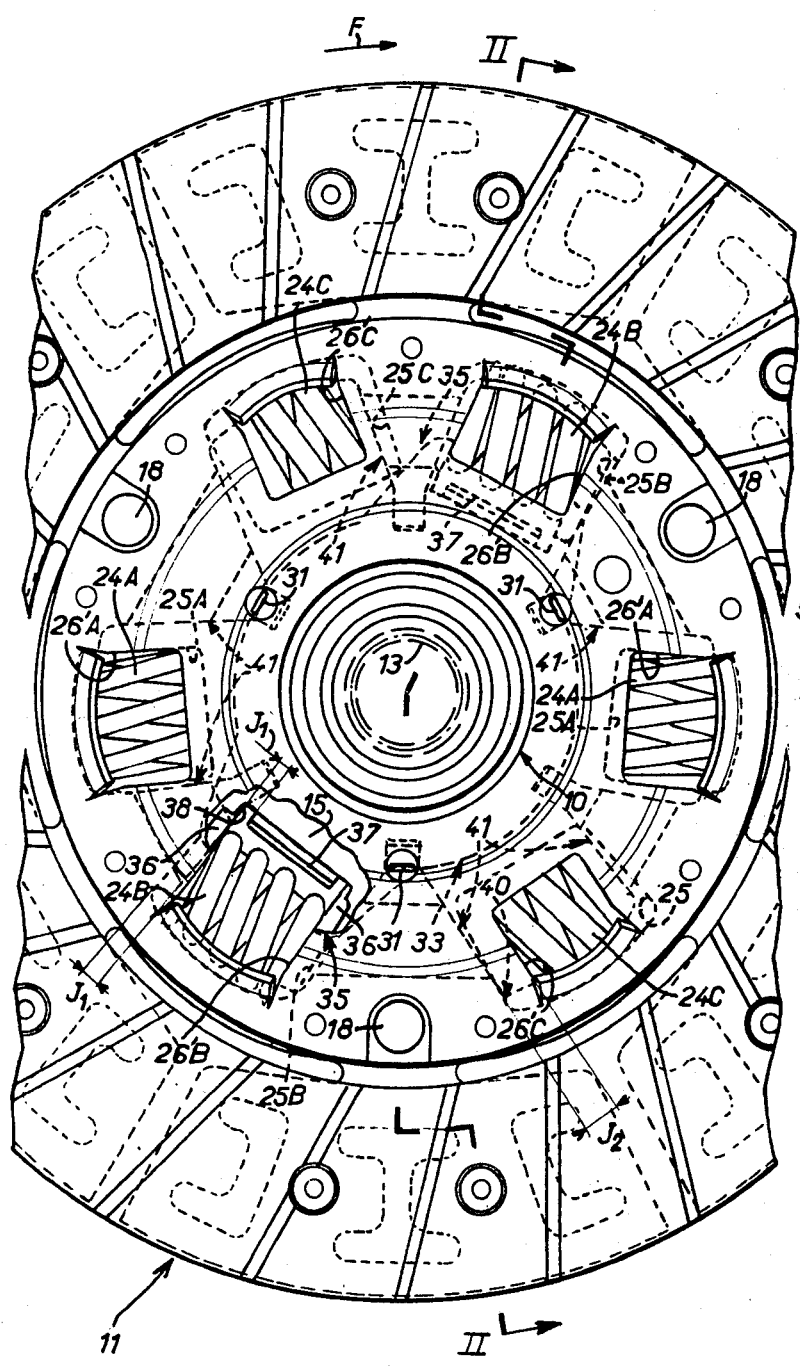
FIG. 1 is a partial view in elevation, with parts broken away, of a torsion damping device according to the invention, taken along the arrow I in FIG. 2.
Figure 2:
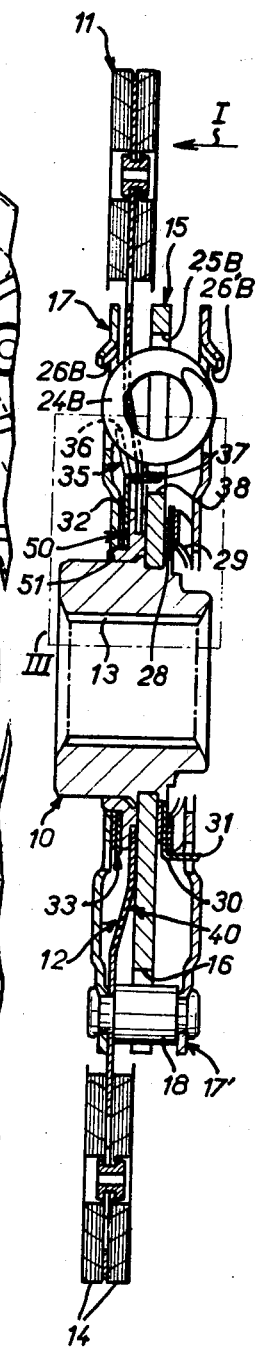
FIG. 2 is a view in axial section of this torsion damping device, along the broken line II—II in FIG. 1.

FIGS. 1 and 2 show a clutch plate assembly with a damper hub for damping torsional vibrations.

As is known, a clutch plate assembly of this kind comprises a torsion damping device consisting of two coaxial parts mounted for relative angular movement, within a predetermined sector, against the action of elastic return means, one of these parts being integral with a hub 10 whilst the other carries a friction disc 11.

In known manner, the hub 10 is provided, at its internal periphery, with splines 13 enabling it to be coupled in rotation with a first shaft, which in practice is a driven shaft, and the friction disc 11 comprises a web 12 which carries, at its external periphery and on each of its faces, friction linings 14 which enable it, by clamping between two plates, to be coupled in rotation with a second shaft, which in practice is a driving shaft.

In the example shown, the first of these two parts consists of a hub disc 15 which projects radially into the median zone of the hub 10 and is integral with the latter either as a result of having been produced in one piece with this hub or having been attached to the latter in a suitable manner.

The second of the said parts in this case comprises two guides discs 17, 17', which extend parallel to the hub disc 15, on either side thereof, and which are joined to one another by means of short posts 18 which pass axially, with play, through slots 16 at the periphery of the hub disc 15.

In the embodiment shown in FIGS. 1 and 2, the posts 18 couple the web 12 to the external peripheries of the guide discs 17, 17' so that the friction disc 11 and the guide discs 17, 17' rotate together. The posts 18 are riveted over at their ends to retain the guide discs 17, 17' through which they pass.

In known manner, circumferentially acting elastic means are interposed circumferentially between the hub disc 15 on the one hand and the guide discs 17, 17' on the other hand.

In the example shown in FIGS. 1 and 2, these elastic means consist of three separate groups or stages A, B, C of springs 24A, 24B, 24C, arranged tangentially in housings formed partly by apertures 25A, 25B, 25C, provided for this purpose in the hub disc 15, and partly by apertures 26A, 26B, 26C and 26'A, 26'B, 26'C, also provided for this purpose in the guide disc 17, 17', respectively.

In the embodiment shown, the springs 24A, 24B, 24C are all in contact, via their ends, with the guide discs 17, 17', for the rest position of the clutch plate assembly, but although the springs 24A are then also in contact, via their ends, with the hub disc 15, the corresponding apertures 25A in this hub disc 15 having a circumferential development equal to that of the corresponding apertures 26A, 26'A in the guide discs 17, 17', the same does not apply to the springs 24B and 24C.

In fact, in the case of the springs 24B, the corresponding apertures 25B in the hub disc 15 have a greater circumferential development than that of the corresponding apertures 26B, 26'B in the guide discs 17, 17', and thus extend beyond the latter circumferentially and on either side; for greater simplicity, it has been assumed that the corresponding play J1 is equal on either side of the springs 24B.

Likewise, a play J2 is provided on either side of the springs 24C between the corresponding apertures 25C in the hub disc 15 on the one hand and the corresponding apertures 26C, 26'C in the guide discs 17, 17' on the other hand, and this play J2 is greater than the play J1.

The play between the posts 18 and slots 16 in the hub disc 15 is of course greater than the above mentioned play J2.

In a manner which is in itself known, friction means are also provided between the two rotatable coaxial parts comprising the torsion damping device according to the invention.

In the embodiment shown in FIGS. 1 and 2, these friction means comprise, near the guide disc 17' a friction washer 28 inserted axially between, on the one hand, the hub disc 15, and, on the other hand, an axially-acting elastic clamping disc 29 which bears on the guide disc 17' and, in the example shown, consists of a corrugated washer of the "ONDUFLEX" type, with a distribution washer 30 interpositioned between the friction washer 28 and the corrugated washer 29. The distribution washer 30 is coupled to the guide disc 17' by means of lugs 31, and the friction washer 28 is fixed to the distribution washer 30 in practice, for example by an adhesive.

The friction means also comprise a friction washer 32, in contact with the guide discs 17, on that face of the latter which is turned towards the hub disc 15.

This friction washer 32 is carried on a support bracket 33, for example by an adhesive, and this support 33 possesses, at its external periphery, in substantially diametrically opposite positions, two radial lugs 35, each notched to form two arms 36, by means of which the support bracket is radially engaged, without play, on the springs 24B.

This support bracket 33 also comprises, between the arms 36 of its radial lugs 35, two axial lugs 37, which pass through the web 12 of the friction disc 11, with play, and which are engaged in grooves 38 in the hub disc 15, which grooves are provided for this purpose on the internal circumferential edge of the apertures 25B which this hub disc 15 possesses for housing the springs 24B.

For the rest position of the clutch plate assembly, a circumferential play J1 is allowed on either side of the axial lugs 37 on the support plate 35 of the friction washer 32, with respect to the grooves 38 in which the axial lugs are engaged, and, in the embodiment shown, this circumferential play J1 is equal to the circumferential play J1 which is associated, as described above, with the springs 24B; as a variant, the plays J1, J2 can be different.

Specific axially-acting elastic clamping means are associated with the friction washer 32.

These means consist of a clamping disc fitted with elastically deformable, radially projecting lugs.

In the embodiment shown in FIGS. 1 to 5, this clamping disc forms an integral part of the web 12 of the friction disc 11 and is formed by the internal periphery of the latter.

The clamping disc is not therefore an individual element.

However, in order to designate it, the internal peripheral part of the web 12 of the friction disc 11 has been given the reference 40 in FIGS. 1 to 5.

According to the invention, the radial lugs 41 with which the clamping disc 40 is provided extend from the internal periphery of the disc, in the direction of the axis of the assembly.

In the embodiment shown, six radial lugs 41 are provided, and it should be noted that this number is different from that of the posts 18 joining the guide discs 17, 17' to one another, the number of posts 18 being reduced to 3.

Figures 4, 5:
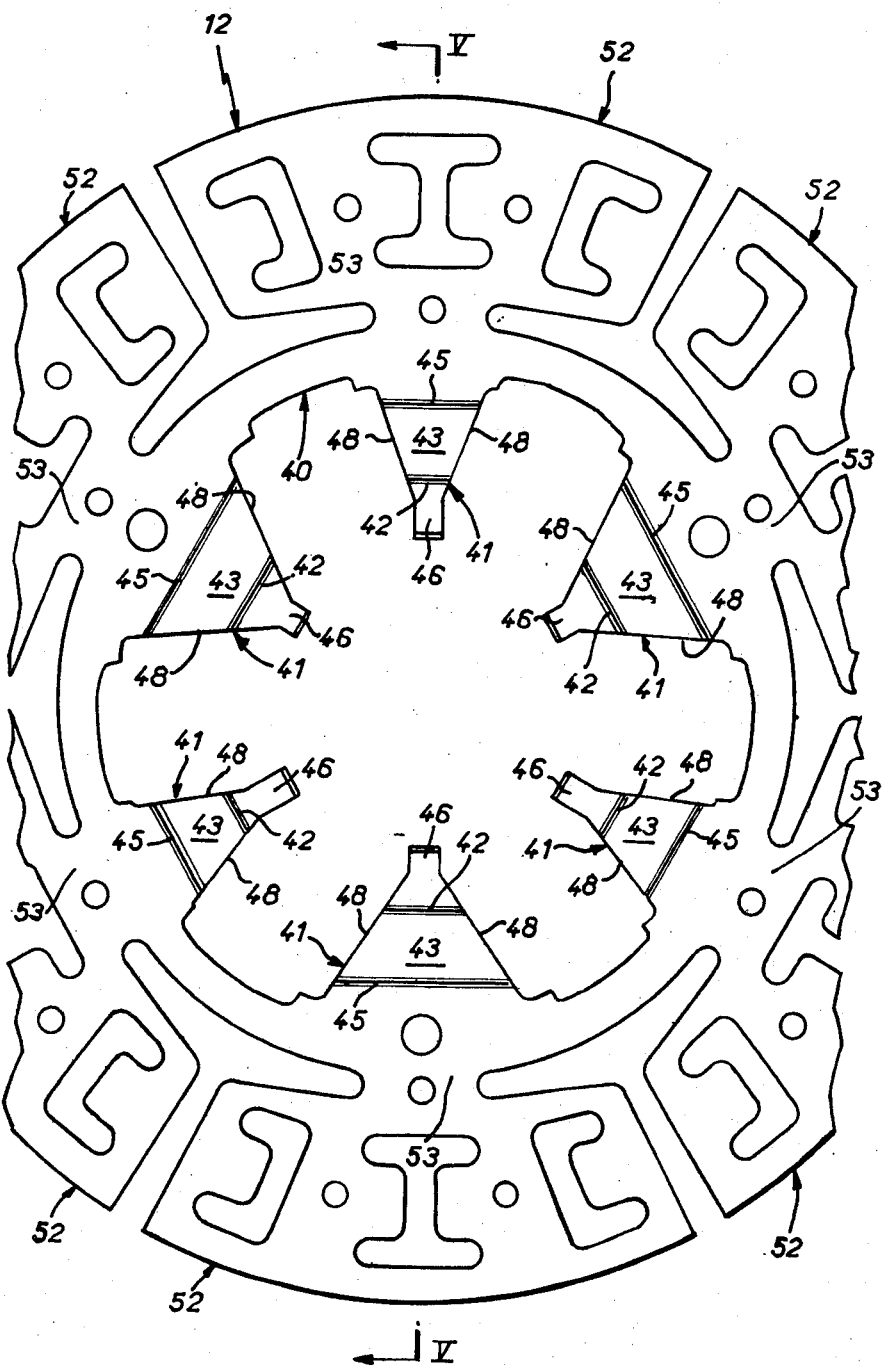
FIG. 4 is a partial view in elevation only of the web of the friction disc incorporated in the torsion damping device shown in FIG. 1.
FIG. 5 is a view in axial section of this web, taken along the line V—V in FIG. 4.

Whatever the case may be, and as shown, each radial lug 41 on the clamping disc 40 is designed with a median bend 42, which is approximately tangential to a circumference common to all the lugs 41, and which delimits, on the lug, two sections forming a dihedral angle with one another, namely a base section 43, by means of which this lug is connected, by a bed 45 parallel to the preceding bend, to the clamping disc which carries it, and an end section 46, by means of which the lug is adapted to act axially; in practice, and as shown, the base section 43 of a radial lug 41 therefore deviates from the plane of the clamping disc 40, whilst, for the remaining free configuration of this lug, its end section 46 comes closer to the said plane, as can be seen in solid lines in FIG. 5.

On the other hand, for the operating configuration of the radial lugs 41, in the torsion damper device of which they form part, the end section 46 of these lugs extends approximately perpendicularly to the axis of the arrangement, as shown in FIG. 2 and as represented schematically in broken lines in FIG. 5.

Preferably, and as shown, over at least part of their length, the lateral edges 48 of each lug 41 are oblique relative to the radius passing through the median zone of this lug, and come closer to one another in the direction of the axis of the assembly.

A radial lug 41 thus has an overall triangular contour which tapers towards the axis of the assembly.

In the embodiment shown, the lateral edges 48 become parallel to one another at the end section 46, in order to increase the seating which this lug 41 provides for the element on which it must act.

In the case in question, a spacer disc 50 is inserted between the radial lugs 41 and the support bracket 33 of the friction washer 32, and this possesses radially, at its internal periphery, a collar 51 forming a bearing for this support bracket 33, this friction washer 32 and the guide disc 17, between these elements and the hub 10.

Preferably, this spacer disc 50 is rotatably associated with that part of the device which comprises the friction disc 11 and the guide discs 17, 17'.

For example, and as shown in FIG. 3, the spacer disc 50 possesses, at its periphery, grooves 55 into which the ends 46 of the radial lugs 41 extend.

As a variant, the collar 51 of the spacer disc 50 can possess, at its periphery, projections or hollows engaging with hollows or projections provided for this purpose on the edge of the internal periphery of the guide disc 17.

As can be seen furthermore in FIGS. 4 and 5, the web 12 of the friction disc 11 is divided at its external periphery into blades 52 for supporting the friction linings 14, each blade being connected to the remainder of this web by means of an approximately radial foot 53.

According to the invention, each of the radial lugs 41 on the clamping disc 40 is in radial alignment with the associated foot 53, in other words the radial lugs are centered on approximately the same radius as their associated feet 53.

When the friction disc 11 is driven in the direction of the arrow F in FIG. 1, the hub disc 15 is initially caused to rotate only by means of the springs 24A until, for the direction of rotation considered, the circumferential play J1 existing between the apertures 25B on the one hand and the apertures 26B, 26'B on the other hand, which apertures serve to house the springs 24B, has been taken up.

After this circumferential play J1 has been taken up, the effects of the springs 24B are combined with those of the springs 24A.

Likewise, after the circumferential play J2 existing between the apertures 25C on the one hand and the apertures 26C, 26'C on the other hand, which apertures serve to house the springs 24B, has been taken up, the effects of these springs 24C are combined with those of the springs 24A and 24B.

Consequently, and as represented schematically in FIG. 6, the curve representing the torque C, plotted on the ordinate, transmitted between the two constituent coaxial parts of the torsion damping device as a function of the angular movement D, plotted on the abscissa, between these two parts, is formed, for each direction of rotation, as a series of three linear sections, the gradients of which are respectively proportional only to the stiffness of the springs 24A in the first case, to the combined stiffness of the springs 24A and 24B in the second case, and to the combined stiffness of the springs 24A, 24B and 24C in the third case.

For simplicity and in order to clarify the graph in FIG. 6, no account has been taken, on the graph, of the hysteresis effects which are due to the friction means which the torsion damper device according to the invention comprises, and which in practice result in a difference in the torque values, for the same value of the angular movement, depending on the direction of change of this angular movement.

In practice, the friction washer 28 in this respect exerts its effect from the start of the angular movement and continues its effects throughout the latter.

The same does not apply to the friction washer 32.

In fact, for the first portion of the angular movement, namely the portion corresponding to the intervention only of the springs 24A, this friction washer 32 has no effect because, since it is rotatably associated with the springs 24B by means of its radial lugs 35, it does not then experience any movement relative to the guide disc 17 with which it is in contact.

The same does not apply after the play J1 specified above has been taken up.

When this occurs, by means of its axial lugs 37, the support bracket 33 of the friction washer 32 then comes into abutment against the hub disc 15, at the corresponding circumferential end of the grooves 38 in which these axial lugs 37 are engaged, with the result that, with the guide discs 17, 17' continuing their angular movement relative to the hub disc 15, a relative movement of corresponding angular displacement is established between the friction washer 32 and the guide disc 17.

From that moment, and hence from the moment when the springs 24B come into action, the friction washer 32 adds its effect to those of the friction washer 28 and this situation continues until the end of the possible angular movement between the guide discs 17, 17' and the hub disc 15, this end being determined, for example, by contact between adjacent turns of at least some of the springs involved.

For the reverse direction of change of this angular movement, the springs 24B return the support plate 33 of the friction washer 32 to its initial position.

In practice, the friction washer 28 can correspond to a low hysteresis and the friction washer 32 can correspond to a high hysteresis, which in any case is higher than that of the washer 28.

However, other solutions can be envisaged, depending on the particular conditions of application.

In the foregoing text, the elastic clamping disc 40 forms an integral part of the web 12 of the friction disc 11.

As a variant, in FIGS. 7 and 8, it forms a separate part from the said web.

For example, in FIG. 7, the web 12 of the friction disc 11 can be arranged near the guide 17', whilst the elastic clamping disc 40, which in this case is an individual element, is near the guide disc 17, as previously.

As a variant, in FIG. 8, the web 12 of the friction disc 11 and the elastic clamping disc 40 can both be on one and the same side of the hub disc 15, for example near the guide disc 17, as previously, whilst at the same time being separate.

In all cases, and as previously, the posts 18 rendering the guide discs 17, 17' integral with one another advantageously ensure the mounting of the elastic clamping disc 40.

Also, in all cases, for these embodiments shown in FIGS. 1 to 8, the axial clamping forces exerted by the clamping disc 40 is exerted axially in the direction of the guide disc 17 located on the same side of the hub disc 15 as the clamping disc 40.

In the foregoing text, it is assumed that the hysteresis effects exerted by the friction means employed were different, depending on the change in the sector of possible angular movement between the two constituent parts of the torsion damper device in question.

In reality, this is not necessarily always the case, in particular when only a relatively low hysteresis is desired.

In this case, in FIGS. 9 and 10, it is possible to employ only the friction washer 28, for example, near the guide disc 17', with the spacer disc 30 which carries it.

However, instead of being subjected to a corrugated washer as the axially-acting elastic means, as previously, it can be subjected to an elastic clamping disc 40 of the type described above, near the guide disc 17.

In such a case, it is advantageous, as previously, for the spacer disc 50, on which the radial lugs 41 on the elastic clamping disc 40 are applied, to be caused to rotate with the latter, either as a result of its grooves 55 into which the free ends 46 of the said lugs penetrate for this purpose, as in FIG. 9, or as a result of its collar 51 being provided with teeth 56 with which complementary teeth 57, provided for this purpose at the internal periphery of the corresponding guide disc 17, engage, as in FIG. 10.

It will be noted, that in either case, the elastic clamping disc 40 is arranged on the other side of the hub disc 15, relative to the friction washer 28 with respect to which it exerts an axial clamping force, or in other words that, in contrast to the arrangement of the embodiments described with reference to FIGS. 1 to 8, the axial clamping force exerted by this clamping disc is exerted axially in the direction of the guide disc 17' arranged on the other side of the hub disc 15, relative to the clamping disc 40.

Furthermore, in the case of the embodiments in FIGS. 9 and 10, the end section 46 of the radial lugs 41 on the clamping disc 40 does not come closer to the plane of the latter for the free rest configuration of these lugs, but extends approximately parallel to this plane.

The present invention is not limited to the embodiments which have been described and shown, but encompasses any modified embodiment and/or modified combination of their various elements within the scope of the appended claims.

In particular, although in the embodiment shown, the radial lugs 41 on the clamping disc 40 are not all identical and are not uniformly distributed in a circle, lugs having a lesser circumferential development alternating with lugs having a greater circumferential development because of the arrangement which is required for the various springs employed, this is not necessarily the case and this should in no way be considered as limiting the present invention.

I claim:

1. A torsion damping device for a motor vehicle clutch, said torsion damping device comprising two coaxial parts mounted for limited relative angular movement within a predetermined sector, a plurality of circumferentially spaced elastic means interposed circumferentially between said coaxial parts, at least one friction washer interposed axially between said coaxial parts, an axially-acting elastic clamping means for exerting an axial force against said friction washer, said elastic clamping means comprising a plurality of elastically deformable lugs projecting radially between circumferentially adjacent ones of said plurality of elastic means, each of said lugs having a radially inner end section separated from a radially outer base section by a chordal bend, said radially inner end section and said radially outer base section defining a dihedral angle with each other, said radially inner end section being cooperable to exert the axial force against said friction washer.

2. A torsion damping device according to claim 1, wherein said elastic clamping means comprises a generally planar clamping disc, said plurality of elastically deformable lugs extending from the inner periphery of said clamping disc, said lugs being connected to said clamping disc by their respective base sections, said base sections extending out of the plane defined by said clamping disc.

3. A torsion damping device according to claim 2, wherein in the unloaded condition of said plurality of lugs, said radially inner end sections of said lugs converge toward the plane defined by said clamping disc.

4. A torsion damping device according to claim 1 or 2, wherein in the loaded condition of said plurality of lugs, said radially inner end sections are approximately parallel to the plane defined by said clamping disc.

5. A torsion damping device according to claim 1 or 2, wherein at least part of the lateral edges of each of said lugs are oblique relative to the radius passing through the middle of said lug, and converge radially inwardly.

6. A torsion damping device according to claim 5, wherein said radially inner sections have parallel lateral edges at their free end.

7. A torsion damping device according to claim 2, wherein one of coaxial parts comprises a guide disc and the other coaxial part comprises a hub, and a spacer disc is located between said guide disc and said hub, and for rotation of said spacer disc grooves are provided at its outer periphery, the ends of said lubs being engaged in said grooves.

8. A torsion damping device according to claim 2, wherein one of the rotatable coaxial parts is fixed for rotation with a friction disc which comprises a generally annular web, said clamping disc comprising the inner periphery of said annular web.

9. A torsion damping device according to claim 8, wherein the web of said friction disc has it outer peripheral part divided into leaf spring elements, each of said leaf spring elements is connected to the remainder of said web by a substantially radial foot, each of said lugs being radially aligned with its associated foot.

10. A torsion damping device according to claim 2, wherein one of said coaxial parts is fixed for rotation with a friction disc which comprises a generally annular web, said clamping disc forming a part separate from said web.

* * * * *